Figure 1:
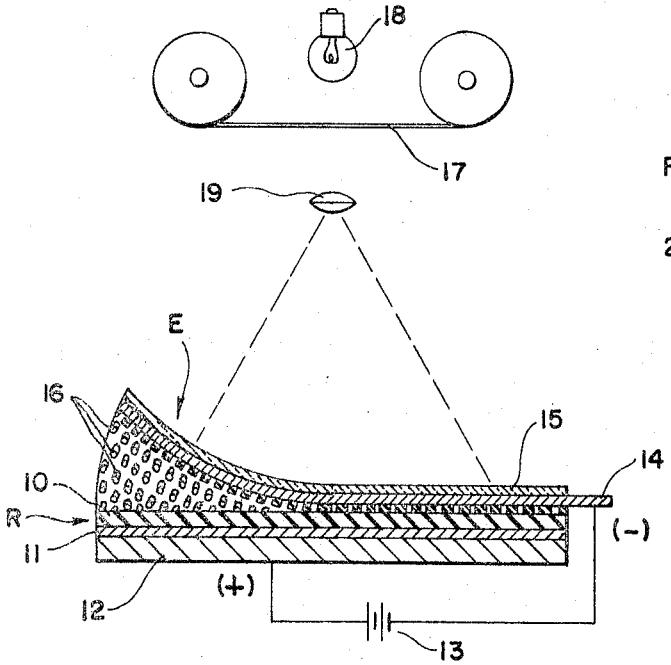
Figure 1A:
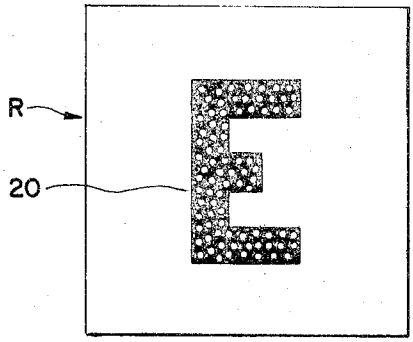
Figure 2:
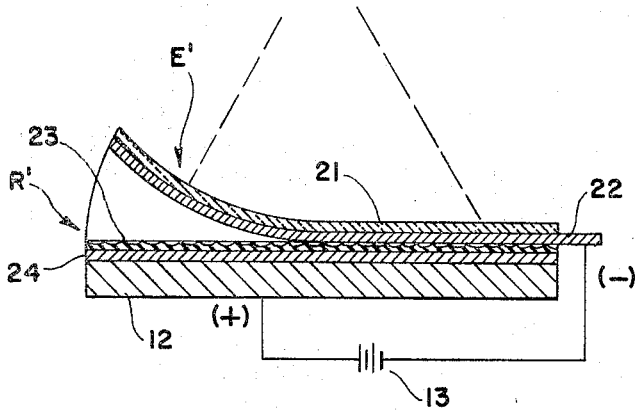
Figure 2A:
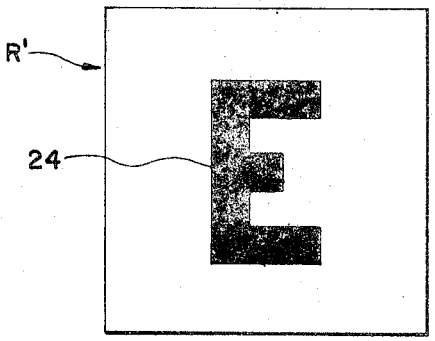

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 29, 1970

878 O.G. 1147

T878,014
IMAGE FORMING METHODS AND MEANS
George K. Czarnikow, 901 Elmgrove Road, Rochester, N.Y. 14650
Filed Mar. 7, 1969, Ser. No. 805,173
Int. Cl. G03g *13/02*
U.S. Cl. 355—17
1 Sheet Drawing. 4 Pages Specification

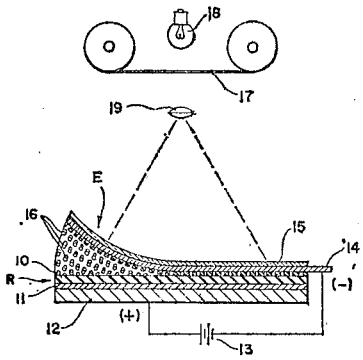

Apparatus and methods are provided for induction charging of a receiver having a photoconductive surface. Proper spacing between the photoconductive surface of the receiver and a conductive surface of an electrode is obtained in one embodiment by providing a photoresist insulative dot pattern on the electrode so that air ionization will take place in the spaces surrounding the photoresist dot pattern during application of a potential between the electrode and a conductive backing on the receiver. Simultaneous or subsequent imagewise exposure will result in an electrostatic image which can be toned to form a half-tone image. In another embodiment the photoconductive surface is made with irregularities which give it a roughness that provides proper spacing for ionization of air between the electrode and the remainder of photoconductive surface. Exposure of the photoconductor may be made through the electrode, which may be transparent, either concurrently with or subsequent to the charging step.

IMAGE FORMING METHODS AND MEANS

Filed March 7, 1969

GEORGE K. CZARNIKOW
INVENTOR.
BY Gary D. Fields
Robert W Hampton
ATTORNEYS